United States Patent

[11] 3,596,667

[72] Inventors Robert R. Buercklin, deceased
2424 Chimney Rock, Houston, Tex. 77027;
Mrs. Billie E. Keeth, executrix, P.O. Box 187, Portia, Ark.
[21] Appl. No. 737,746
[22] Filed June 17, 1968
[45] Patented Aug. 3, 1971

[54] ELECTRICALLY DRIVEN FINGERNAIL TRIMMER
12 Claims, 5 Drawing Figs.
[52] U.S. Cl. ..................... 132/73.6
[51] Int. Cl. ..................... A45d 29/05
[50] Field of Search .................. 132/73.6, 75.8

[56] References Cited
UNITED STATES PATENTS
1,706,483  3/1929  Corbett ................. 172/179
2,389,665  11/1945  Harris .................. 132/75.8
2,597,525  5/1952  Kessler ................. 132/75.8

FOREIGN PATENTS
1,355,632  11/1964  France ................. 132/73.6
959,756  3/1957  Germany ............... 132/73.6

OTHER REFERENCES
Science News Letter, Aug. 22, 1964, Vol 86 #8 page 124

Primary Examiner—Louis G. Mancene
Attorney—William E. Ford

ABSTRACT: The housing of the trimmer provides a boss on top with upper surface round or preferably oval in contour, the boss extending arcuately downwardly and inwardly so that the fingertip may extend protectively under its top surface as the fingernail bears against an emery connected to a shaft rotated by a fractional horsepower motor within the trimmer housing. The emery wheel and motor shaft are connected in manner that they are assembled with the trimmer housing against displacement of the shaft in direction of its axis; the preferred contour of the top surface of the boss being preferably elliptical to give the best fingertip protection, as when a long fingernail is to be trimmed.

PATENTED AUG 3 1971    3,596,667
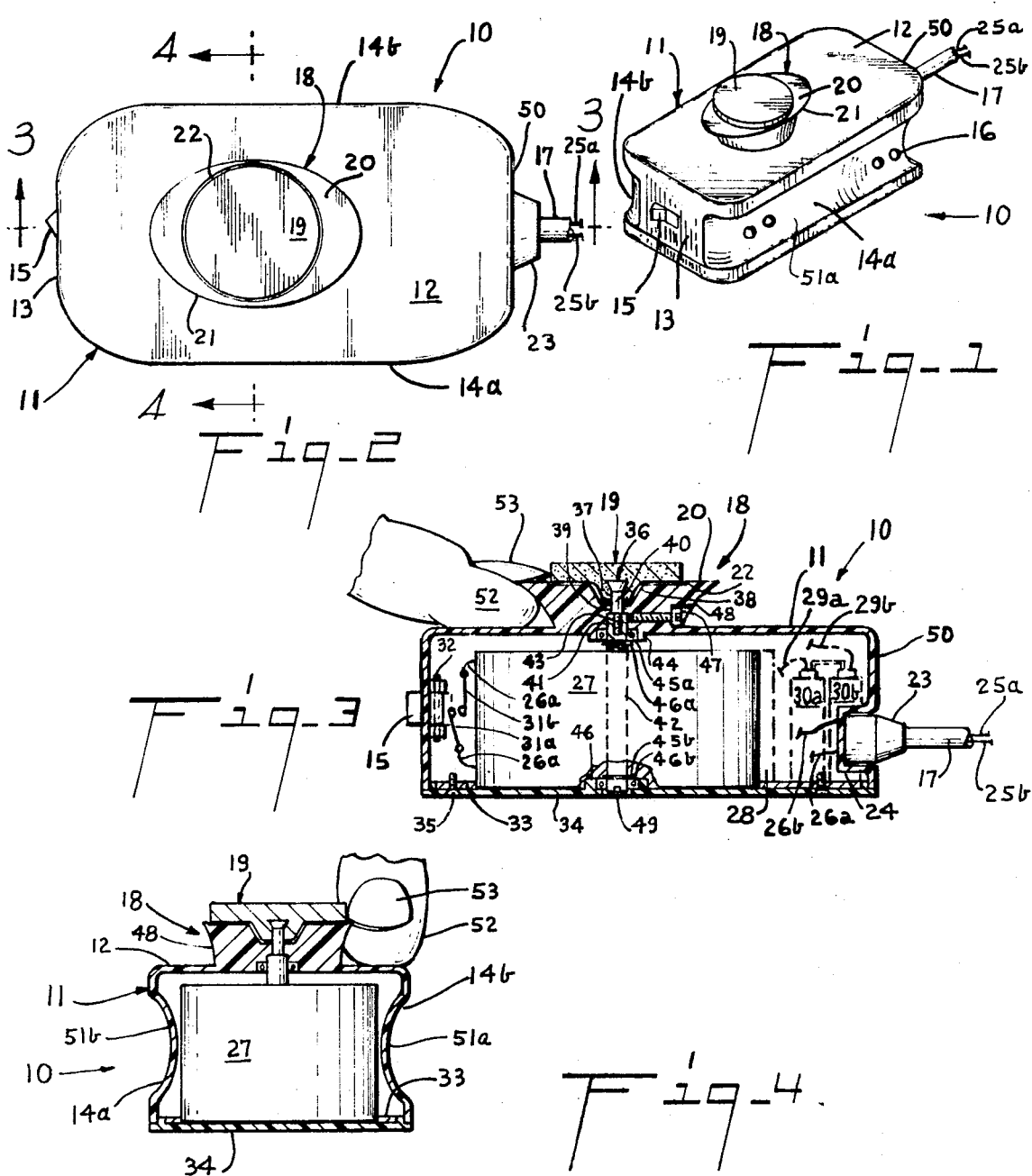
ROBERT R. BUERCKLIN
INVENTOR
BY  Wm. E. Ford
ATTORNEY

ELECTRICALLY DRIVEN FINGERNAIL TRIMMER

The invention relates to an electrically driven fingernail trimmer of the type which provides an emery wheel upon a boss atop the motor housing in manner that the fingertip flesh may be protected as it bears guidably against the downwardly and inwardly extending side surface of the boss that is provided below the boss top surface level.

The invention has the primary object of providing a fingernail trimmer of this class which mounts an emery wheel on a boss atop the housing in manner to provide great and substantial protection under the top surface of the boss for the fingertip as the fingernail or the tip contacts the emery wheel.

As another important object the invention provides a fingernail trimmer of this class which includes means to connect the emery wheel to the upper end of the motor shaft in manner to inhibit axial displacement of the motor shaft with relation to the trimmer housing.

It is also another and further object of the invention to provide a fingernail trimmer of this class which may be fractionally horsepower driven by a motor driven by a source of alternating current electrical power, or by a direct current motor driven by storage battery means within the motor housing.

As yet an additional object, the invention provides a fingernail trimmer of this class which has an emery wheel mounting boss atop the motor housing with upper boss surface being oval, preferably elliptical in contour.

Other and further objects will be apparent when the specification herein is considered in connection with the drawings, in which:

FIG. 1 is an isometric view of the top, front and one side of an electrically driven fingernail trimmer comprising a preferred embodiment of the invention;

FIG. 2 is a plan view of the trimmer shown in FIG. 1;

FIG. 3 is a longitudinal sectional elevational view, taken along line 3—3 of FIG. 2;

FIG. 4 is a transverse sectional elevational view taken along line 4—4 of FIG. 2; and FIG. 5 is an elevational view of an emery wheel comprising a modification of the form of emery wheel shown in sectional detail in FIG. 4.

Referring now in detail to the drawings in which like reference numerals are applied to like elements in the various views, a fingernail trimmer 10 is shown in FIG. 1 as comprising a housing 11 with top 12, front 13 and left side 14a; a switch 15 being shown centrally in the front 13; ventilation holes 16 being shown in the left side 14a; an extension or conductor cord 17 being shown extending from the rear end of the trimmer 10; and a boss 18 mounting an emery wheel 19 being shown disposed above the housing top 12. Also, the right side 14b is shown in front portion in FIG. 1, and may be considered as having ventilation holes therein corresponding with the holes 16 shown in the left side 14a.

As shown in FIGS. 2, 3 and 4, the top surface 20 of the boss 18 is shown as being in the form of an ellipse 21 in contour, with the emery wheel 19 being shown as being of diameter to rotate within a counterbore, or recess 22, with slight clearance thereinbetween. Also, in FIG. 2 the extension or conductor cord 17 is shown extending from a plug 23 which is insertable into a receptacle 24, FIG. 3, so that the cord conductor wires 25a, 25b connect electrically with the respective conductor wires 26a, 26b from the receptacle 24, within the housing 11 to the fractional horsepower motor 27 therein. As an alternative arrangement, the motor may be a direct current motor 28 with conductors 29a, 29b, to opposite sides of dry cells 30a, 30b, series connected, all as indicated in dotted lines in FIG. 3.

With either arrangement, the conductor 26a (or 29a for a DC motor) will include switch contactors 31a, 31b therein, and thence the conductor 26a will connect into the motor, (say the positive side thereof). On the other hand the conductor 26b, (or 29b for a DC motor 28) will connect into the opposite (preferably negative) side of the motor 27. The switch 15 which closes the contactors 31a, 31b is indicated as angular in shape with pivot 32 near the apex of the angle, the switch being preferably of the toggle-action type, which will stay closed, or stay open, until oppositely pressed inwardly.

The motor 27 (or 28) includes a base flange or plate 33 which is connected to the bottom or closure 34 for the housing 11 by means of countersunk head screws 35 passed inwardly through the aforesaid bottom 34 and threaded through the flange or plate 33, as indicated in FIG. 3. As shown in FIG. 3, the bottom or closure 34 is pressfitted into the housing 11. Obviously other methods and structures for assembly may be considered. For instance, assembly may be completed by engaging the screws 35 into threaded bores of projections extending inwardly from the underside of the housing top 11.

As shown in FIGS. 3 and 4, the head of a screw 36 is embedded in a frustoconical hub 37 formed on the under side of the emery wheel 19. Correspondingly, concentric within the counterbore or recess 22 the boss 18 is countersunk at 38 with the central bore 39 thereof receiving therethrough the upper shank 40 of the screw 36. The boss 18 is shown bored with a larger diameter hole 41 from the underside, coaxial with the central bore 39, so that the base of the hole or bore 41 provides a downwardly facing shoulder in restraint of further upward extension of the upper end of the motor drive shaft 42.

In order to assemble emery wheel 19 to be rotated with the motor shaft 42, the upper end of the motor shaft 42 is internally threaded to receive the reduced-diameter, externally threaded lower shank portion 43 of the emery wheel embedded screw 36. Thus the emery wheel 19 and motor shaft 42 are assembled with the aforesaid downwardly facing shoulder in the boss 18 restraining the motor shaft 42 against displacement in direction of its axis.

The boss 18 is shown as providing a downwardly extending pad 44 on the inner side thereof which is counterbored around the shaft bore 41 to provide a recess to receive therein an antifriction means, as a bail bearing race 45a for the shaft 42. Also, a spacer or holddown ring 46a is shown about the shaft 42 to hold the upper ball bearing race 45a in place. In like manner, an upwardly or inwardly projecting pad 46 is shown bored and counterbored in the housing closure 34 to provide a seat for a ball bearing race 45b for the shaft 42. A holddown ring 46b is provided about the motor shaft 42 to hold the lower ball bearing race 45b in position against displacement.

Noticeably a setscrew 47 is shown passed transversely through the arcuately inwardly and downwardly extending side surface 48 of the boss 18, below the boss top 20, just short of engaging the shaft 42 when the trimmer 10 is in use. Then, when it is desired to disassemble the emery wheel 19 from the drive shaft 42, the screw 47 is set up on to bind the shaft 42 against rotation, and the emery wheel 19 is turned in direction to disengage the lower threaded shank 43 of the screw 36 from the upper end of the aforesaid shaft 42. As an optional means for facilitating disengagement of emery wheel 19 from motor shaft 42, a screwdriver slot 49 may be provided in the lower end of the shaft 42, and held while the emery wheel 19 is turned in direction to disengage the shank 43 for the drive shaft end.

The front side 13 of the housing 11 extends substantially straight downwardly with relation to the housing top 12, and so does the rear side 50, except for the recessed part which provides the receptacle 24. However, the left and right sides 14a and 14b have the surface beneath the top formed concavely respectively along 51a, 51b, with the concave surfaces running around the respective corners of the housing 11 to join the front and rear sides 13, 50. Thus there is provided such concave surfaces 51a, 51b better to serve as finger grips when the trimmer 10 is in service.

Although the boss 18 may be of a round configuration, it nevertheless must upstand as well as the shape of boss shown in FIGS. 3 and 4 must upstand; and also there must be enough material outwardly of the recess 22 to insure that the small rim of material around the emery wheel does not break out. See FIG. 4. However, preferably, the top 20 of the boss 18 should be oval, as elliptical, for instance, and thus the fingertip 52 to be protected, as best shown in FIG. 3 is spaced from the fingernail 53 to be trimmed, and in ample degree. The trimmer may also be employed to trim the sides of a fingernail 53, in which case the aforesaid side surface 48 of the boss 18 is arcuate or concave in ample degree to protect the side flesh of a finger.

As shown in FIG. 5, a buffer 55 is installed on top of an emery wheel 19, the emery wheel being otherwise as constructed in FIGS. 1—4, inclusive. The buffer 55 may be of the durable type that is of substantially the life of the emery wheel, in which case its connection to the emery wheel is substantial in nature.

Otherwise, where the buffer 55 is of comparably short life with regard to the emery wheel, then it will be expedient for the connection of emery wheel and buffer to be easily disengageable, although positively effective when an individual buffer is in service. In either case, since the means and method of connecting a fingernail buffer to a holding means is conventional, it is not felt necessary to show connection in detail. For instance, in FIG. 5, the heavy line separating emery wheel and buffer may indicate that the buffer is glued or cemented to the emery wheel.

The invention is not limited to the particular structural arrangements, with alternatives shown, but other embodiments, forms, variations and improvements are all considered, as long as such may fall within the broad spirit of the invention, and within the broad scope of interpretation claimed for and merited by the appended claims.

What I claim is:

1. An electrically driven fingernail trimmer having a housing with a lower side closure plate mounting a fractional horsepower motor, the motor shaft upper end portion extending centrally upwardly thereabove, said housing including a boss upstanding with axis normal to the top thereof, the top outer surface extending substantially parallel to said closure plate, the boss on top being at least one of round and oval contour with top surface being substantially parallel to said housing outer top surface and having a first bore centrally therethrough, said boss being slightly recessed on top by slight counterboring and being countersunk downwardly below said slight recess to provide a central recess downwardly into said boss, an underside counterbore bored upwardly into said boss and of greater diameter than said first bore thereabove thus to provide a shoulder with said motor shaft upper end portion to be received upwardly into said counterbore, connection means extending through said bore to connect the motor shaft upper end portion and an emery wheel against axial displacement of said shaft with shaft end face to bear notatably against said shoulder, said boss on top being at a predetermined spaced distance from said top and substantially parallel thereto, said boss extending sidewardly arcuately downwardly and inwardly to said housing top to provide such space relation as to permit a finger to be placed flat on the housing top leaving the fingernail exposed on the boss top whereby guidably to receive fingertip flesh to bear protectedly against said boss side surface and downwardly guidably on said housing top surface as the nail of the finger is brought to bear against said motor-rotated emery wheel.

2. An electrically driven fingernail trimmer as claimed in claim 1, in which said motor is connected by an extension cord to a source of electrical power.

3. An electrically driven fingernail trimmer as claimed in claim 1 in which said housing carries storage battery means therein connected to supply the electrical power to drive said motor.

4. An electrically driven fingernail trimmer as claimed in claim 1 in which said boss top contour is round and is slightly recessed by counterboring concentrically within said round contour with said emery wheel being disposed to extend above said recess and of slightly lesser diameter than said counterbore.

5. An electrically driven fingernail trimmer as claimed in claim 1 in which said boss top contour is oval and is slightly recessed by counterboring centrally within said oval contour with said emery wheel being disposed to extend above said recess and of slightly lesser diameter than said counterbore.

6. An electrically driven fingernail trimmer as claimed in claim 1 in which said contour is oval in the form of an ellipse.

7. An electrically driven fingernail trimmer as claimed in claim 1 in which said contour is oval in the form of a 45° ellipse.

8. An electrically driven fingernail trimmer as claimed in claim 1 in which said motor is electrically connected to a plug-receptacle means included by said housing.

9. An electrically driven fingernail trimmer as claimed in claim 1 which includes an extension cord with conductors from the motor extending from said housing and being anchored with relation thereto and terminating outwardly in an insertable plug.

10. An electrically driven fingernail trimmer as claimed in claim 1 in which said emery wheel includes a buffer thereon.

11. An electrically driven fingernail trimmer as claimed in claim 1, in which said motor shaft has a screwdriver slot in the under end thereof whereby said shaft may be held stationary as said emery wheel is disengaged therefrom.

12. An electrically driven fingernail trimmer as claimed in claim 1, in which said boss has a setscrew transversely thereinto to bear against said motor shaft to hold said shaft stationary as said emery wheel is disengaged therefrom.